United States Patent [19]

Exelmans et al.

[11] Patent Number: 5,548,126
[45] Date of Patent: Aug. 20, 1996

[54] APPARATUS FOR READING AN IMAGE FROM A STIMULABLE PHOSPHOR SHEET

[75] Inventors: Walter Exelmans, Merksem; Gentil Verbeke, Edegem, both of Belgium

[73] Assignee: Agfa-Gevaert, N.V., Mortsel, Belgium

[21] Appl. No.: 522,099

[22] Filed: Aug. 31, 1995

[30]     Foreign Application Priority Data

Sep. 29, 1994 [EP]   European Pat. Off. ............... 94202815

[51] Int. Cl.⁶ ................................................... G03B 42/02
[52] U.S. Cl. ........................................... 250/588; 250/585
[58] Field of Search ..................................... 250/588, 585

[56]                References Cited

U.S. PATENT DOCUMENTS 5,434,431   7/1995   Verbeke et al. ......................... 250/588

FOREIGN PATENT DOCUMENTS 1086744   5/1986   Japan ..................................... 250/588
1124938   6/1986   Japan ..................................... 250/588

*Primary Examiner*—Davis L. Willis
*Assistant Examiner*—Richard Hanig
*Attorney, Agent, or Firm*—Breiner & Breiner

[57]            ABSTRACT

An apparatus is described for reading an image from a stimulable phosphor sheet (1) carrying a radiation image thereon. The apparatus comprises exposing means (2) for exposing the sheet (1) to scanning stimulating radiation which causes the sheet (1) to emit light in the pattern of the stored image, the stimulating radiation being deflected into the trace direction by means of galvanometric deflection. Detecting means (13) photo-electrically detect the emitted light. Erasing means (22) progressively exposes the sheet (1) to erasing radiation during the retrace steps of the galvanometric deflection to erase any residual image on the sheet (1) to enable subsequent re-use thereof by exposure of the sheet (1) to erasing radiation.

7 Claims, 2 Drawing Sheets

APPARATUS FOR READING AN IMAGE FROM A STIMULABLE PHOSPHOR SHEET

DESCRIPTION

1. Field of the Invention

The present invention relates to a radiation image read-out system, and in particular to a method for reading an image from a stimulable phosphor sheet carrying a radiation image thereon.

2. Background of the Invention

In the field of digital radiography a system has been developed wherein X-rays transmitted by an exposed object (such as the body of a patient) are stored on a photostimulable phosphor screen (a PSL system). In the PSL system, a PSL X-ray plate has applied thereto a layer of photo-stimulable luminescent material which comprises a phosphor, for example a europium-activated barium fluorohalide and a binder. The phosphor has the characteristic that it can be energised to an excited state by X-rays, and can then be stimulated by visible or infra-red light to return to the ground state with the emission of visible light. The stimulating radiation is arranged to have a different wavelength from the emitted light. A PSL plate is potentially re-usable many times. In order to extract the image from the exposed plate, the plate may be transported past a scanning station where light, typically from a laser having a wavelength within the range of 500 to 850 nm, scans line-wise across the plate in front of a light guide comprising a bundle of optical fibres. The input ends of this bundle are arranged in a line for the reception of light emitted, typically at wavelengths close to 400 nm, when the PSL material is stimulated by the laser. The light-guide is arranged to pass the emitted light to a photo-multiplier tube or other receptor. The result is a storable raster image.

A galvanometer scanner is the preferred deflecting element for raster scanning. The galvanometer is normally driven with a triangular wave, causing the laser spot to travel across the width of the sheet at constant speed after which the mirror is returned to its starting position as quickly as possible. The latter motion is referred to as "retrace". The laser beam is normally interrupted during the retrace step in order to avoid affecting the information stored on the sheet. A so-called optical chopper, synchronised with the galvanometer motion, is used to do this.

The scanning exposing radiation used to stimulate the phosphor does not remove all the available stimulable energy. Before re-using the plate, all traces of the residual image have to be removed. This is usually achieved by subjecting the plates to uniform erasing radiation after they have been scanned.

As described in U.S. Pat. No. 4,952,806 (Nobufumi Mori) the phosphor sheet is exposed to stimulating rays causing the sheet to emit light in proportion to the amount of energy stored thereon, and the emitted light is detected to obtain a representative image signal and thereafter the sheet is exposed to erasing light to release the energy remaining thereon, enabling the sheet to be re-used.

In order to avoid stray light from the erasing radiation being detected as stimulated emission by the read section of the machine an erase section may be built so that none of the erasing illumination can escape from it. However, a completely light-tight unit is difficult to build and to ventilate without the unit becoming mechanically complex. Alternatively the plate is erased only after it has been completely read. This inserts a dead-time in the machine cycle during which no other plate can be read. This dead-time has a negative effect on the throughput of the machine. The dead-time can only be reduced at the cost of using an erase lamp with a very high intensity. A further alternative is to filter the spectrum of erasing radiation using a long wavelength pass filter which removes all wavelengths corresponding to the stimulated emission. However, unless a perfectly monochromatic light source is used, spectral filtering will inevitably waste some fraction of available erase light and therefore require a higher power erase unit.

SUMMARY OF THE INVENTION

It is an object of the present invention to provide a method of erasing the residual image in an image plate substantially simultaneously with the scanning and reading of the plate without the aforementioned disadvantages.

We have discovered that this objective can be achieved by progressively exposing the sheet to erasing radiation during the retrace steps of the galvanometric deflection.

Thus, according to a first aspect of the invention there is provided an apparatus for reading an image from a stimulable phosphor sheet carrying a radiation image thereon, the apparatus comprising:

exposing means for exposing the sheet to scanning stimulating radiation which causes the sheet to emit light in the pattern of the stored image, the stimulating radiation being deflected into the trace direction by means of galvanometric deflection:

detecting means for photo-electrically detecting the emitted light: and erasing means for erasing any residual image on the sheet to enable subsequent re-use thereof by exposure of the sheet to erasing radiation, characterised in that the erasing means progressively exposes the sheet to erasing radiation during the retrace steps of the galvanometric deflection.

According to a second aspect, the invention also provides, in a radiation image read-out system in which a stimulable phosphor sheet carrying a radiation image thereon is exposed to scanning stimulating radiation which causes the sheet to emit light in the pattern of the stored image and the emitted light is photo-electrically read out, the stimulating radiation being deflected into the trace direction by means of galvanometric deflection, a method of erasing any residual image on the sheet to enable subsequent re-use thereof by exposure of the sheet to erasing radiation, characterised by progressively exposing the sheet to erasing radiation during the retrace steps of the galvanometric deflection.

Preferably, the erasing means comprises one or more flash lamps positioned beyond the detecting means and electrical circuitry to fire the or each the flash lamp only during retrace steps of the galvanometric deflection. Suitable flash lamps include Krypton or Xenon filled linear flashlamps. A suitable wavelength for the erasing radiation is within the range of 400 to 900 nm. The flash lamps are preferably positioned close to the plate surface, for example from 1 to 5 cm therefrom. The plate need not be exposed to erasing radiation immediately following stimulation and read-out, but the sooner the plate is exposed to erasing radiation the better in terms of the most efficient use of time and space. The erasing means may comprise a plurality of flash lamps arranged across the width of the phosphor sheet. By the use of a plurality of flash lamps, the associated charging circuits can make use of smaller capacitors than would be needed if a single flash lamp were used, thus decreasing recharging time. This is important since the time taken by the galvanometer trace may be for example only 15 milliseconds. While the flash need not be fired on every retrace step, we prefer that the flash is fired every 3 or 4 lines, resulting in a required recharging time of from 45 to 60 milliseconds.

In preferred embodiments of the invention, the apparatus further comprises a baffle or screen to protect the detecting means from radiation from the erasing means. Such a screen may also prevent erasing radiation from falling on that part of the plate which has not yet been read out. Even with a reflector to direct most of the erasing radiation from the flash lamps to the phosphor plate, some radiation may escape either directly or via reflection from the plate. Some baffling inside the apparatus is therefore advantageous to keep this stray light from reaching either the unread portions of the phosphor plate where it can erase information or the photomultiplier where intense light can cause in increase in dark current, lasting for hours, even though the photomultiplier is not powered at the time of exposure.

The detecting means for the emitted radiation preferably comprises a photomultiplier having a high voltage supply and the electrical circuitry includes means for gating the high voltage supply when the or each the flash lamp is fired.

Because of its high internal gain, the sensitivity of the photomultiplier is such that it may be difficult to screen stray light from the flash lamps to the extent necessary to protect the photomultiplier. Turning off the power supply to the photomultiplier during the duration of the light pulse from the flash lamps is therefore particularly advantageous.

A filter may be provided to remove ionising radiation wavelengths from radiation from the erasing means, that is to say to remove wavelengths shorter than 400 nm. By removing infra-red wavelengths from the erasing radiation, any heating effect upon the phosphor sheet is thereby reduced.

A galvanometer scanner is the preferred deflecting element for raster scanning because it readily adapts to various sheet formats. The galvanometer may be driven with a triangular wave, causing the laser spot to travel across the width of the sheet at constant speed of for example from 10 to 40 m/s, followed by a retrace step of from 150 to 600 m/s, more preferably from 200 to 400 m/s, while the phosphor sheet is advanced at a speed of from 5 to 20 mm/s.

PREFERRED EMBODIMENTS OF THE INVENTION

The invention will now be further described, purely by way of example, by reference to the accompanying drawings in which:

FIG. 1 shows schematically an apparatus for use in the method of the invention; and FIG. 2 shows a simplified schematic of the electrical circuitry for use with the apparatus shown in FIG. 1.

DETAILED DESCRIPTION OF PREFERRED EMBODIMENTS

Figure 1:
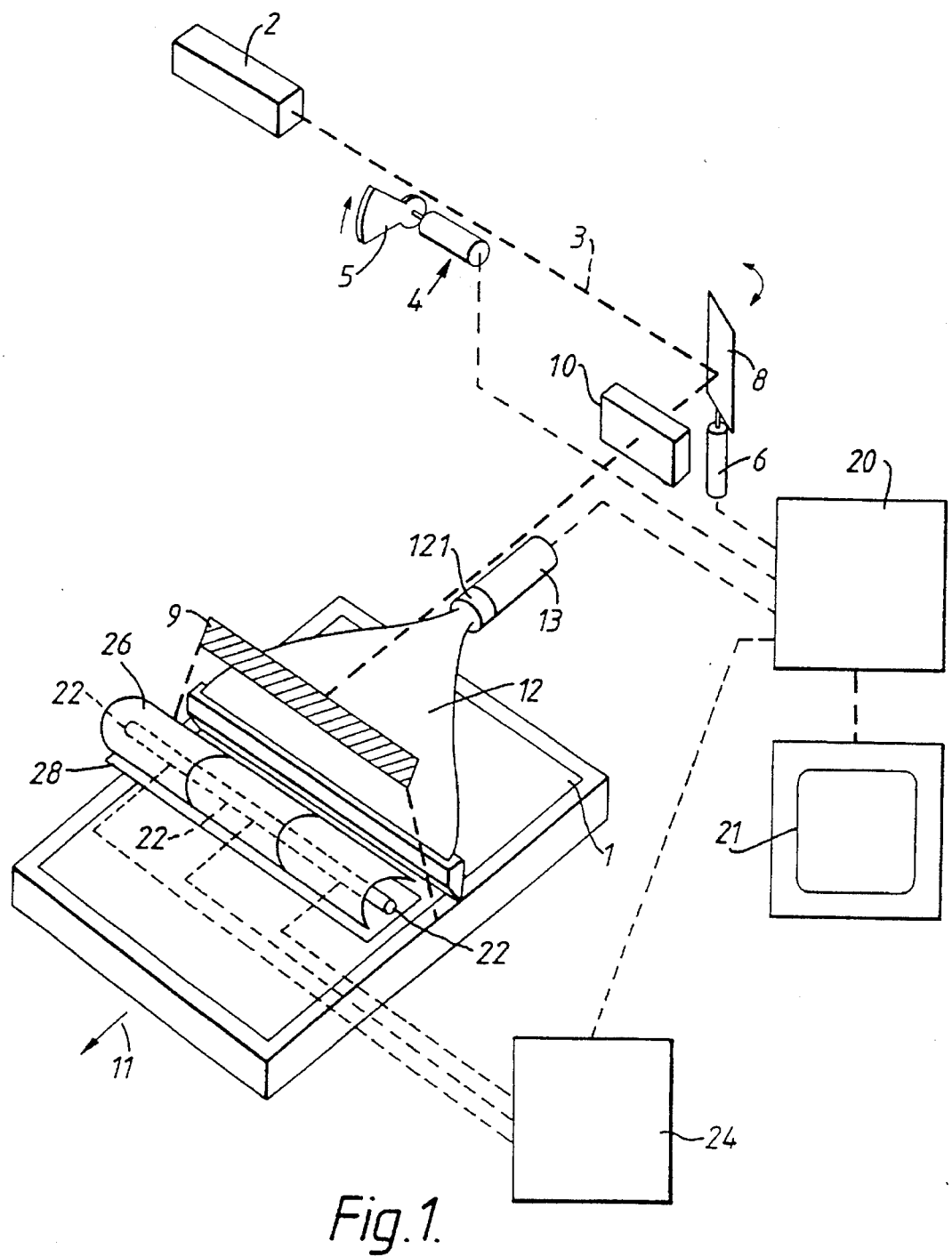

In FIG. 1, a PSL sheet read-out station is shown. After a stimulable phosphor sheet 1 is exposed to radiation, such as to X-rays, passing through an object to have a radiation image stored thereon, it is sent to the read-out station shown in FIG. 1. A laser beam 3, having a wavelength of 633 nm, is emitted from a helium-neon laser source 2, is directed towards a galvanometer mirror 8. The laser beam 3 is one-dimensionally deflected by the galvanometer mirror 8 and by a plane reflection mirror 9 onto the phosphor sheet 1. Drive means 6 cause the galvanometer mirror to reciprocate in a triangular wave pattern enabling the laser beam 3 to constitute scanning stimulating radiation which falls on the sheet 1 and causes the sheet 1 to emit light in the pattern of the stored image. A light chopper 4, including a rotating disc segment 5, is positioned to enable the disc segment to interrupt the laser beam pathway during the galvanometer retrace step. The disc segment 5 represents 72° of a circle, to match that proportion of the scanning cycle represented by the retrace step.

An f(θ) laser beam focusing device 10, known in the art, ensures a uniform beam diameter during scanning of the beam on the phosphor sheet 1 and also ensures that the uniform angular velocity of the reciprocating mirror 8 results in the laser spot travelling across the phosphor sheet 1 at a uniform linear speed. The arrangement is such that a spot of laser light, having a full width at half maximum of 60 μm scans the phosphor sheet at a main scanning speed of 35 m/sec, and a retrace speed of 300 m/sec. Transport means not shown are provided to transport the sheet 1 at a uniform speed of 12.5 mm/sec in the direction of the arrow 11, to enable the whole sheet to be scanned in a uniform manner.

Positioned close to, but behind the scanning line of the laser beam 3 on the phosphor sheet 1, is a light guide 12 which receives light emitted and reflected from the phosphor sheet 1. The output end of the light guide 12 is positioned adjacent a photo-detector in the form of a photomultiplier 13, which produces an electrical signal that is proportional to the light intensity falling thereon. Between the output end of the light guide 12 and the photomultiplier 13 there is placed an optical filter 121 that transmits the stimulated emission from the phosphor sheet 1 but selectively reflects or absorbs light at the wavelength of the laser that is used to stimulate the phosphor sheet. Alternatively this optical filter can be placed at the input end of the light guide 12.

Suitable electrical connections are made to pass the output signal from the photomultiplier 13 to a computer 20 which serves to control the light chopper 4 and the galvanometer mirror drive 6 and is additionally connected to a display unit 21, such as a VDU screen.

Alternatively or additionally the output of the computer 20 is used to produce a permanent record of the raster image.

Three flash lamps 22 are arranged and in line across the width of the phosphor sheet 1 and at a distance of about 3 cm from the surface thereof, at a position beyond the line of exposure by the scanning laser beam 3 and thus beyond the photomultiplier 13. The flash lamps 22 are provided for erasing any residual image on the sheet 1 to enable subsequent re-use thereof by exposure of the sheet 1 to erasing radiation. The flash lamps 22 progressively expose the sheet 1 to erasing radiation during the retrace steps of the galvanometric deflection. The flashlamps have a spectrum that approximates that of a black body whose colour temperature varies from 5000° K. To 7000° K., depending on the current density that is reached in the flash lamps a number of Xenon (or Krypton) lines are superimposed on this continuum emission. The lamps are provided with a reflector 26 that directs the light to the phosphor sheet 1 and also serves as a screen to protect the photomultiplier 13 from direct radiation from the flash lamps 22. Each flash lamp is also provided with a filter 28 to remove light with a wavelength shorter than 400 nm that might otherwise excite the phosphor in a manner similar to ionising radiation. Typically, the energy required for erasure of a plate having dimensions 35 cm×43 cm is about 300 joules.

Electrical circuitry 24 linked to the computer 20 is provided to fire the flash lamps 22 only during retrace steps of the galvanometric deflection. The circuitry 24 includes capacitors capable of firing and recharging every 50 milliseconds. The photomultiplier 13 comprises a high voltage supply and the electrical circuitry 24 also includes means for gating the high voltage supply when the flash lamps 22 are fired.

Figure 2:
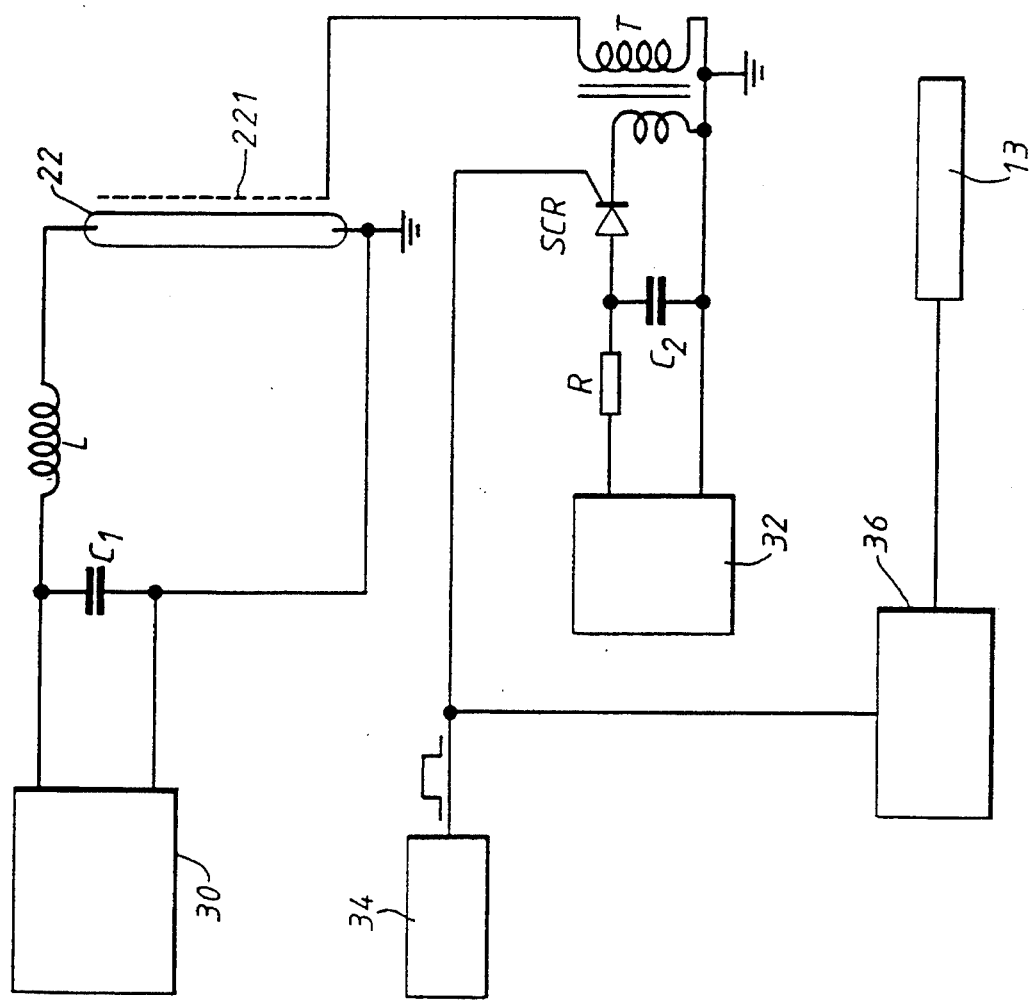

Referring to FIG. 2, a flash lamp power supply 30 charges a capacitor $C_1$ to the appropriate voltage. When a high voltage pulse is applied to a trigger wire 221 wrapped around the flash lamp 22, capacitor $C_1$ discharges through the flashlamp 22 generating an intense pulse of light. An inductor L ensures that the current pulse in the flash lamp is near critically damped.

The trigger pulse is generated by discharging a capacitor $C_2$ through the primary winding of a pulse transformer T, capacitor $C_2$ being charged by a trigger power supply 32 via a resistor R. The discharge of capacitor $C_2$ is initiated by an SCR device that is itself switched to the conducting state by the rising edge of The SYNC pulse from a SYNC source 34.

The SYNC signal is synchronised with the galvanometer drive circuit and delivers a pulse at the start of every "nth" retrace where "n" is an integral number with a minimum of 1.

The SYNC signal is also connected to the photomultiplier power supply 36. For the duration of the SYNC pulse it interrupts the power supply to the photomultiplier 13.

We claim:

1. An apparatus for reading an image from a stimulable phosphor sheet (1) carrying a radiation image thereon, said apparatus comprising:

exposing means (2) for exposing said sheet (1) to scanning stimulating radiation which causes said sheet (1) to emit light in the pattern of the stored image, said stimulating radiation being deflected into the trace direction by means of galvanometric deflection;

detecting means (13) for photo-electrically detecting said emitted light; and erasing means (22) for erasing any residual image on said sheet (1) to enable subsequent re-use thereof by exposure of said sheet (1) to erasing radiation, characterised in that said erasing means (22) progressively exposes said sheet (1) to erasing radiation during the retrace steps of said galvanometric deflection.

2. An apparatus according to claim 1, wherein said erasing means (22) comprises one or more flash lamps positioned beyond said detecting means (13) and electrical circuitry (24) to fire the or each said flash lamp only during retrace steps of said galvanometric deflection.

3. An apparatus according to claim 2, wherein said erasing means (22) comprises a plurality of flash lamps arranged across the width of the phosphor sheet (1).

4. An apparatus according to claim 2, wherein said detecting means (13) comprises a photomultiplier having a high voltage supply and said electrical circuitry includes means for gating said high voltage supply when the or each said flash lamp is fired.

5. An apparatus according to claim 1, further comprising a screen (26) to protect said detecting means (13) from direct radiation from said erasing means (22).

6. An apparatus according to claim 1, further comprising a filter (28) to remove ionising radiation wavelengths from radiation from said erasing means (22).

7. In a radiation image read-out system in which a stimulable phosphor sheet (1) carrying a radiation image thereon is exposed to scanning stimulating radiation which causes said sheet (1) to emit light in the pattern of the stored image and said emitted light is photo-electrically read out, said stimulating radiation being deflected into the trace direction by means of galvanometric deflection, a method of erasing any residual image on said sheet (1) to enable subsequent reuse thereof by exposure of said sheet (1) to erasing radiation, characterised by progressively exposing said sheet (1) to erasing radiation during the retrace steps of said galvanometric deflection.

\* \* \* \* \*